(12) United States Patent
Petak (10) Patent No.: US 9,362,730 B2
(45) Date of Patent: Jun. 7, 2016

(54) BRACKET AND ASSEMBLY FOR ELECTRICAL DEVICES

(71) Applicant: Cablofil, Inc., Mascoutah, IL (US)

(72) Inventor: Randy William Petak, Pico Rivera, CA (US)

(73) Assignee: CABLOFIL, INC., Mascoutah, IL (US)

( * ) Notice: Subject to any disclaimer, the term of this patent is extended or adjusted under 35 U.S.C. 154(b) by 13 days.

(21) Appl. No.: 14/489,342

(22) Filed: Sep. 17, 2014

(65) Prior Publication Data

US 2016/0079742 A1    Mar. 17, 2016

(51) Int. Cl.
*H02G 3/12* (2006.01)
*H02G 3/14* (2006.01)
*H02G 3/08* (2006.01)

(52) U.S. Cl.
CPC ............... *H02G 3/12* (2013.01); *H02G 3/081* (2013.01); *H02G 3/14* (2013.01)

(58) Field of Classification Search
CPC .......... H02G 3/12; H02G 3/081; H02G 3/14; H02G 3/10; H02G 3/18; H02G 3/086; H02G 3/121
USPC ................................. 174/50, 520, 535, 53–58
See application file for complete search history.

(56) References Cited

U.S. PATENT DOCUMENTS

| | | |
|---|---|---|
| 1,225,525 A | 5/1917 | Sweet |
| 3,879,641 A | 4/1975 | Byrd |
| 4,399,922 A | 8/1983 | Horsley |
| 4,533,060 A | 8/1985 | Medlin |
| 4,569,458 A | 2/1986 | Horsley |
| 4,572,391 A | 2/1986 | Medlin |
| 4,603,789 A | 8/1986 | Medlin, Sr. |
| 4,688,693 A | 8/1987 | Medline, Jr. |
| 4,732,356 A | 3/1988 | Medlin, Sr. |
| 4,757,908 A | 7/1988 | Medlin, Sr. |
| 4,964,525 A | 10/1990 | Coffey |
| 5,098,046 A | 3/1992 | Webb |
| 5,176,345 A | 1/1993 | Medlin |
| 5,224,673 A | 7/1993 | Webb |
| 5,263,676 A | 11/1993 | Medlin, Jr. et al. |
| 5,288,041 A | 2/1994 | Webb |
| 5,423,499 A | 6/1995 | Webb |
| 5,595,362 A | 1/1997 | Rinderer et al. |
| 5,952,610 A | 9/1999 | Bosse, Jr. |
| 5,965,844 A | 10/1999 | Lippa |
| 6,188,022 B1 | 2/2001 | He |
| 6,209,836 B1 | 4/2001 | Swanson |
| 6,323,424 B1 | 11/2001 | He |
| 6,384,334 B1 | 5/2002 | Webb |
| 7,667,137 B1 | 2/2010 | Beckman |
| 8,025,577 B2 | 9/2011 | LaBarge, III |
| 8,912,440 B2 | 12/2014 | Petak et al. |
| 2002/0092953 A1* | 7/2002 | De Leu ............... H02G 3/121 248/27.1 |
| 2003/0205654 A1* | 11/2003 | Petak .................. H02G 3/12 248/300 |
| 2006/0163247 A1* | 7/2006 | Bryant .................. H02G 3/12 220/3.2 |
| 2010/0078535 A1* | 4/2010 | Brocklesby ............ H02G 3/121 248/224.8 |
| 2014/0318853 A1* | 10/2014 | Korcz .................. H02G 3/121 174/503 |
| 2015/0263499 A1* | 9/2015 | Korcz .................. H02G 3/121 174/61 |

* cited by examiner

*Primary Examiner* — Hoa C Nguyen
*Assistant Examiner* — Amol Patel
(74) *Attorney, Agent, or Firm* — Bryan Cave LLP (57) ABSTRACT

The present disclosure is directed to a bracket and electrical assembly including such bracket for mounting or securing to a concrete masonry unit (CMU).

25 Claims, 9 Drawing Sheets

BRACKET AND ASSEMBLY FOR ELECTRICAL DEVICES

FIELD OF THE DISCLOSURE

The present disclosure generally relates to a bracket for securing an electrical assembly to a concrete wall.

BACKGROUND

In standard wood or metal frame building construction, electrical receptacle boxes can simply be mounted on upright wood or metal wall studs, in order to mount an electrical device, such as a convenience outlet or an electrical switch, and associated electrical conduit and the like. Building construction using concrete masonry units (CMUs) (also known and referred to herein as concrete blocks, cinder blocks, or masonry blocks), however, provides a unique challenge in that at least some wiring of electrical receptacles needs to be completed as the wall is being built, thus requiring cooperation between electricians and masons.

Before installation of an electrical device in a concrete block wall, an electrician must typically first build an electrical assembly which includes an electrical box, a cover or frame (sometimes referred to as a plaster ring), conduit fitting, and a section of conduit. Once the mason builds the concrete block wall to the desired level of electrical installation, the electrician must hold the assembly in place while the mason notches the block to accommodate the assembly, applies the mortar, and sets the block. The electrician must then secure the assembly within the block, which typically involves filling the hollow core of the block with broken pieces of block and mortar. This process can be time-consuming and must be completed before the mason arrives at the next desired location for electrical installation.

SUMMARY OF THE DISCLOSURE

Among the various aspects of the present disclosure is the provision of a bracket and an electrical assembly including such a bracket for mounting or otherwise securing a standard electrical assembly (e.g., electrical box, cover, and electrical device) within (that is, the bracket and/or electrical assembly including such bracket is disposed at least partially or completely within) a concrete masonry unit (CMU) (particularly, for example, the inner core region of one or more CMUs).

Briefly, therefore, the present disclosure is directed to a bracket for securing within an inner core region of a concrete masonry unit (CMU). In general, the bracket comprises a face portion having a front side, a back side, and a bracket opening. In one embodiment, the face portion is substantially planar. The bracket also comprises two or more support members extending rearwardly away from the back side. In certain embodiments, the support member(s) include one or more holes configured to receive one or more fasteners for mounting the bracket to an inner core surface of the inner core region of the CMU. In other embodiments, the support member(s) are configured to apply a force to one or more surfaces of the inner core region of the CMU, thus securing the bracket within the CMU; for example, the support member(s) may be spring-loaded or provided with a torsion bend.

Another aspect of the disclosure is directed to an electrical assembly including the bracket for securing the assembly within an inner core region of a concrete masonry unit (CMU). The bracket comprises a face portion having a front side, a back side, and a bracket opening. In one embodiment, the face portion is substantially planar. The bracket also comprises two or more support members extending rearwardly away from the back side for securing the bracket within the inner core region of the CMU. In certain embodiments, the support member(s) include one or more holes configured to receive one or more fasteners for mounting the bracket to an inner core surface of the inner core region of the CMU. In other embodiments, the support member(s) are configured to apply a force to one or more surfaces of the inner core region of the CMU, thus securing the bracket within the CMU; for example, the support member(s) may be spring-loaded or provided with a torsion bend. In addition to the bracket, the electrical assembly comprises an electrical box having top, bottom, and side walls defining a front opening. The bracket opening is configured to cooperate with the front opening of the electrical box when the electrical box is positioned on the back side of the face portion. The electrical assembly also comprises a cover plate for positioning on the front side of the face portion and mounting on the electrical box in a covering relationship to the front opening and the bracket opening and capable of mounting an electrical device. The electrical device can be included as part of the electrical assembly and can be, for example, a convenience outlet, an electrical switch, an electrical terminal, or combinations thereof. Other suitable electrical devices are also contemplated.

The shape of the bracket opening will generally depend upon the shape of the front opening of the electrical box to be used in conjunction therewith. The bracket opening can be, for example, substantially rectangular-shaped, substantially square-shaped, or substantially circular-shaped. Thus, for example, the electrical box shape and/or the front opening thereof can likewise be substantially rectangular-shaped (e.g., for single-gang electrical boxes), substantially square-shaped (e.g., for dual-gang electrical boxes), or substantially round or circular-shaped (e.g., for electrical fixtures), or any other shape that cooperates with the bracket opening.

As noted above, the bracket comprises two or more support members which facilitate securing the bracket within the inner core region of the CMU. In various embodiments, for example, the bracket may comprise two, three, four, five, six, or more support members. In one embodiment, the bracket comprises four support members. In another embodiment, the bracket comprises two support members.

In certain embodiments, the support member(s) generally include a support member arm portion that is connected to the face portion (e.g., on or near the back side of the face portion) and extends rearwardly away from the face portion (particularly, a back side or region thereof). In these embodiments, the support member arm (or a portion thereof) can be used as a mounting portion for mounting the support member to a surface of the inner core region of the CMU, or can be connected to another mounting portion for mounting the support member to a surface of the inner core region of the CMU.

In other embodiments, the support member(s) may be configured to apply a force to an inner surface(s) of the inner core region of the CMU. For example, the support member(s) may be spring-loaded or provided with a tension bend, whereby the bracket is pressed against, or wedged between, substantially or partially opposing surfaces of the inner core region of the CMU.

In various embodiments, the support member (including, in certain embodiments, support member arms and/or other mounting portions thereof) extend rearwardly from the face portion at various angles. In one embodiment, for example, the support member(s) may extend rearwardly from the face portion at an angle that substantially corresponds with the shape of the inner core of the CMU to facilitate mounting of the bracket to a surface of the CMU inner core (via the support member). In another embodiment, for example, the support member(s) may extend rearwardly from the face portion at an angle(s) that facilitate the application of a force to an inner surface(s) of the inner core region of the CMU (e.g., via a torsion bend). By way of example, in CMUs having a substantially cuboid- or rectangular cuboid-shaped inner core, the support members can extend substantially perpendicularly away from the back side (i.e., at substantially a 90 degree angle). For differently-shaped CMU inner cores, the support members can extend at other angles that generally correspond to the shape of such inner cores, to facilitate securing of the bracket within the inner core (via the support member, e.g., the bracket arm or other suitable portion). In one particular embodiment, the support member(s) comprises a support member arm and a mounting portion extending from the support member arm. In one embodiment, for example, the mounting portion extends inwardly from the support member arm. In another embodiment, for example, the mounting portion extends outwardly from the support member arm. In yet another embodiment, for example, the mounting portion extends substantially perpendicularly inwardly from the support member arm (i.e., at substantially a 90 degree angle). In yet another embodiment, for example, the mounting portion extends substantially perpendicularly outwardly from the support member arm (i.e., at substantially a 90 degree angle). Holes for mounting the support member(s) to the inner core of the CMU can be provided in the support member arms, for example, and/or in a mounting portion thereof. In certain of these embodiments, the support member arms extend substantially perpendicularly away from the back side of the face portion and the mounting portion is connected to the support member arms such that the mounting portion is substantially parallel to the back side of the face portion. In other embodiments, the support member arms and mounting portion (if present) extend at angle(s) that generally correspond to the shape of the inner core of the CMU.

As noted above, the support member arm(s) extend rearwards from the face portion to facilitate mounting of the bracket to a surface of the CMU inner core. The length of the support arm(s) can vary, and brackets having shorter or longer support arms may be utilized depending, for example, on the dimensions of the inner core region of the CMU and/or the size of the mounting hardware (e.g., shorter or longer screws). For example, the support member arm(s) may have a length that is substantially similar to the dimensions of the inner core region of the CMU, such that the support member arm(s) (or a mounting portion thereof) abut or nearly abut the inner core surface opposite the back side of the face portion. By way of another example, the support member arm(s) may have a length that is shorter than the dimensions of the inner core region of the CMU, such that longer mounting hardware (e.g., screws) can be used to secure the support member arm(s) (or a mounting portion thereof) to the inner core surface opposite the back side of the face portion.

Another aspect of the present disclosure is directed to a method of securing an electrical assembly including the bracket within an inner core region of a CMU. The method comprises combining the bracket, electrical box, and cover plate to form the assembly and securing the bracket within the inner core region of the CMU. It will be understood that the assembly may be formed either before or after securing the bracket.

According to additional aspects of the present disclosure, kits are provided that may be used to construct the brackets and/or electrical assemblies and/or carry out the methods described herein. For example, a kit may comprise one or more face portions and one or more support members, whether already assembled to form the bracket or in separate pieces for assembly by the end user. By way of another example, the kit may comprise a bracket (again, whether assembled or unassembled), an electrical box, and a cover plate, optionally assembled to form the electrical assembly. The kits may further include fasteners (e.g., for assembling the bracket and/or the electrical assembly, and/or for securing the bracket and/or the electrical assembly within the CMU), an electrical device, conduit, conduit fittings, electrical wire, and the like. The kit may also include instructions, for example, for assembling the bracket and/or the electrical assembly, and/or for securing the bracket and/or the assembly within the CMU.

For purposes of the present disclosure, CMUs that can receive the bracket and electrical assembly described herein comprise a concrete block having one or more (e.g., two or three) vertically extending cavities or cores extending therethrough. CMUs typically have a nominal length of about 16 inches (~410 millimeters) and are available in nominal widths of about 4, 6, 8, 10, and 12 inches (~100, ~150, ~200, ~254, and ~300 millimeters, respectively). For example, one particularly common CMU has a nominal size of 16×8×8 inches (410×200×200 millimeters).

Although CMUs commonly have a substantially rectangular shape, it will be understood that the bracket and assembly described herein can be utilized in connection with any shape or style block having a hollow core. For instance, a range of specialized shapes or block portions exist in order to accommodate particular construction features, such as score lines, grooves, or flutes on various sides of the CMU, bullnose (i.e., rounded) corners, cut headers, lintels, stretchers on one or both ends of the block, and the like. A variety of decorative blocks also exist and can accommodate the bracket and electrical assembly disclosed herein in a hollow inner core region thereof.

Therefore, it will be understood that the bracket and electrical assembly (and components thereof) can have a range of shapes and angles for use, for example, in CMUs having non-rectangular cores (e.g., pear core CMUs) and/or with electrical boxes of varying shapes and sizes.

Other objects and features will be in part apparent and in part pointed out hereinafter.

BRIEF DESCRIPTION OF THE DRAWINGS

The details of the present disclosure, both as to its construction and operation can best be understood with reference to the accompanying drawings, in which like numerals refer to like parts, and in which.

DETAILED DESCRIPTION OF THE PREFERRED EMBODIMENTS OF THE DISCLOSURE

The accompanying Figures and this description depict and describe embodiments of a bracket and electrical assembly in accordance with the present disclosure, and features and components thereof. It should also be noted that any references herein to front and back, right and left, top and bottom and upper and lower are intended for convenience of description, not to limit an invention disclosed herein or its components to any one positional or spatial orientation.

Referring to FIGS. 1-4, an exemplary bracket 100 is illustrated. Bracket 100 may be fabricated from any suitably rigid material. In exemplary embodiments, suitable rigid materials include, but are not limited to, sheet metal and plastic. In certain embodiments, bracket 100 may be generally rectangular with a top edge 102, an opposite bottom edge 104, and opposing side edges 106, 108. The portion of the bracket 100 between the top edge 102, bottom edge 104, and side edges 106, 108 is defined as a face portion 110.

Bracket 100 further comprises an opening 112 disposed in the face portion 110 for cooperating with an opening in an electrical receptacle box and a corresponding cover plate or frame, to be discussed more fully hereinafter. In certain embodiments, opening 112 is disposed closer to the top edge 102 than the bottom edge 104. Although the Figures illustrate that opening 112 is substantially square-shaped, it will be understood that opening 112 can have a variety of shapes to cooperate with differently-shaped electrical boxes and/or cover plates (e.g., for one-gang, two-gang, and other electrical fixtures or installations). In one embodiment, for example, opening 112 can be substantially rectangular-shaped, substantially square-shaped, or substantially circular-shaped. Oval, triangular, or any other polygonal shapes for opening 112 are also contemplated.

Figure 1:
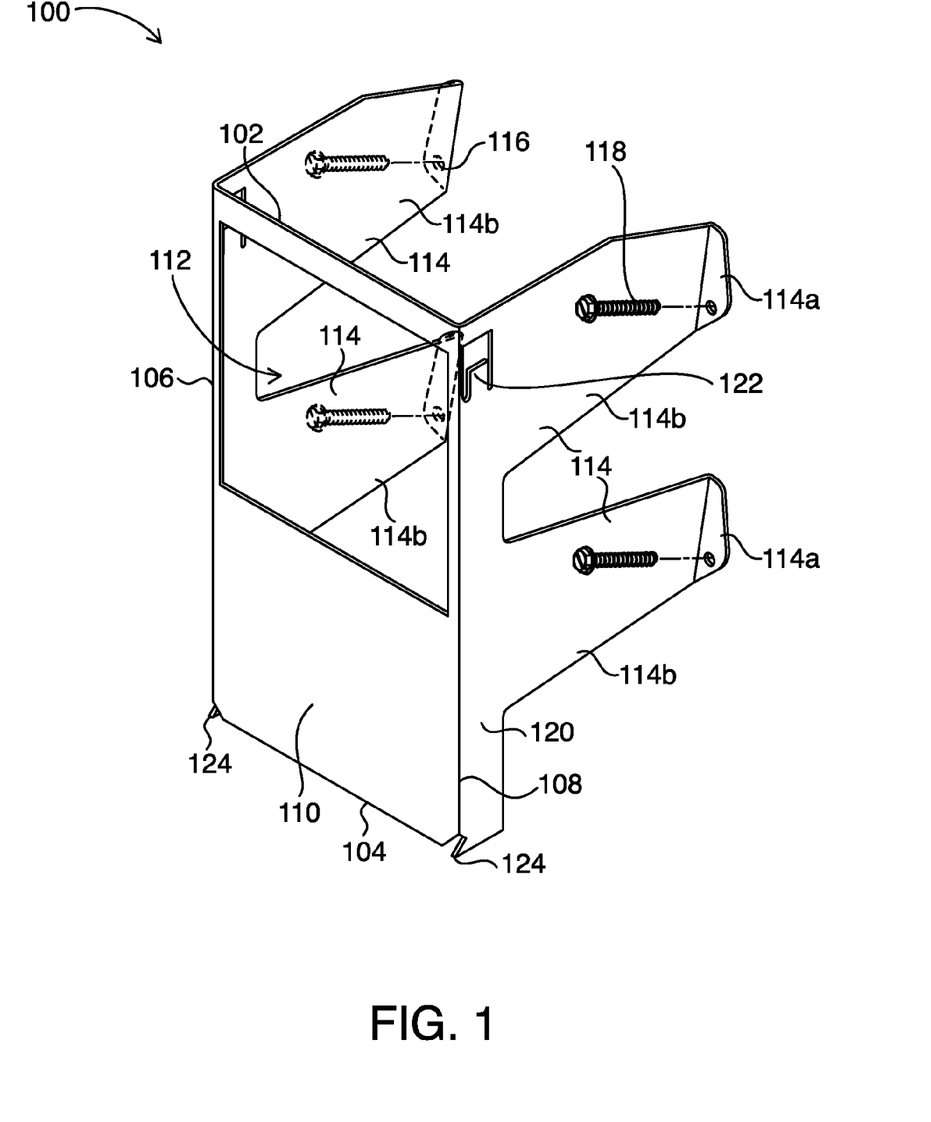
FIG. 1 is a perspective view of a bracket in accordance with an exemplary embodiment of the present disclosure.
Figure 2:
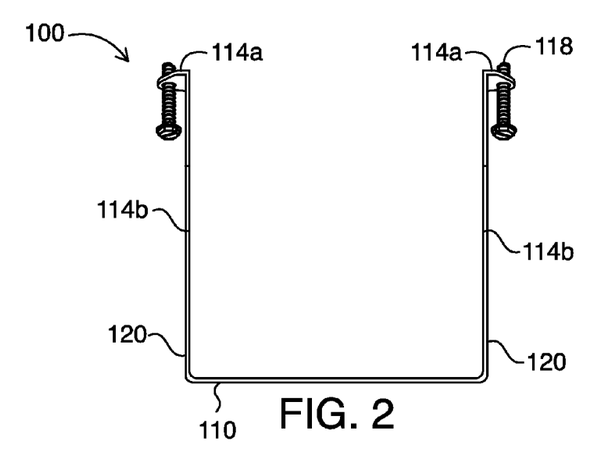
FIG. 2 is a top side view of a bracket in accordance with an exemplary embodiment of the present disclosure.
Figure 3:
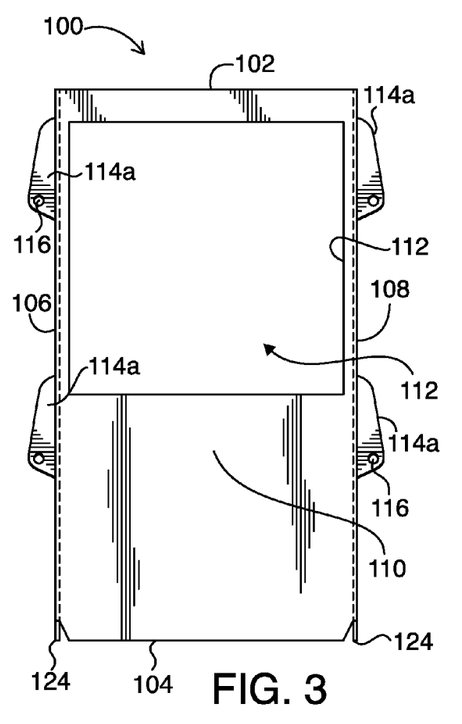
FIG. 3 is a front side view of a bracket in accordance with an exemplary embodiment of the present disclosure.
Figure 4:
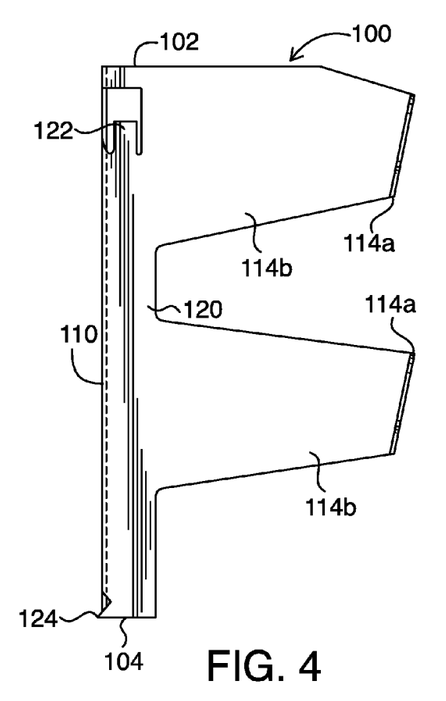
FIG. 4 is a right side view of a bracket in accordance with an exemplary embodiment of the present disclosure.

The bracket 100 also includes at least two support members 114 extending away from the back side of face portion 110. As illustrated in FIGS. 1, 3 and 4, one preferred embodiment includes four support members 114. In connection with the illustrated embodiments, the support member includes at least one (e.g., one, two, three, four, etc.) hole 116. Fasteners 118 are disposed in holes 116 in the support member(s) 114 for securing the bracket 100 to an inner surface of the hollow core of a CMU, to be described more fully hereinafter. In one preferred embodiment shown in FIGS. 1 and 2, for example, the holes 116 and corresponding fasteners 118 are positioned in a mounting portion 114a extending at an angle from support member arm 114b. Typically, support member arm 114b is oriented substantially perpendicularly to the back side of the face portion 110. It will be appreciated that hole(s) 116 may additionally or alternatively be positioned in the support member arm(s) 114b of the support member(s), for example, for securing the bracket to a different inner core surface of the CMU. As such, the mounting portion 114a of the support member(s) disposed substantially parallel to the back side of the face portion may or may not be present on the support member(s) 114 if holes are provided in the bracket arm portions 114b. Exemplary fasteners 118 include, but are not limited to, threaded screws (e.g., those suitable for concrete applications), nuts and bolts, screw or nail anchor systems, and other suitable fastening devices.

In other embodiments (not shown) independent of or in combination with the holes and fasteners discussed above, the support members can be configured to apply a force to a surface(s) of the inner core region of the CMU, as described above. For example, the support member(s) may comprise spring-loaded components and/or a torsion bend for securing the bracket within the inner core of the CMU by pressing or wedging the bracket against substantially or partially opposing surfaces of the inner core of the CMU.

As noted previously, the overall shape of the bracket 100 will generally depend upon the shape of the inner core of the CMU in which the bracket and assembly is to be used. For instance, brackets having convex or concave face portions 110 (as opposed to the substantially planar face portions as shown in the Figures) and/or support member(s) 114 having various shapes and angles (e.g., rounded, triangular, etc.) (as opposed to the substantially rectangular face portions as shown in the Figures) are contemplated.

In some embodiments, the bracket 100 is formed as a single unitary member. In other embodiments, the support member(s) 114 can be permanently or removably attached to optional side flanges 120 of the face portion of the bracket (as shown, for example, in FIGS. 1, 2, and 4) or attached to the back side of the face portion (not shown) by welding, gluing, or using fasteners (e.g., rivets, screws, nuts and bolts, etc.).

The thickness of the rigid material forming the bracket 100 can range from about 0.02 inches to about 0.1 inches (about 0.5 millimeters to about 2.5 millimeters), e.g., from about 0.04 inches to about 0.08 inches (about 1 millimeter to about 2 millimeters). In various embodiments, the thickness of the different regions of the bracket 100 may or may not be uniform (e.g., the support member(s) 114 may be thicker than the face portion 110 and thus more rigid to provide additional mounting strength).

The bracket 100 may also include additional structures and/or components to assist in securing the bracket within the inner core region of the CMU. For example, a tab 122 may be optionally provided in the side flanges 120. In use, the tab 122 can be bend outward to form a stop that rests against the CMU and further prevents the bracket from disengaging from the inner core region of the CMU. The face portion 110 and/or the side flanges 120 may also include one or more projections 124 for gripping a surface of the inner core region. As the bracket is tightened, for example, projections 124 can dig into the surface of the block and these additional points of contact further secure the bracket to the inner core region of the CMU.

Figure 5:
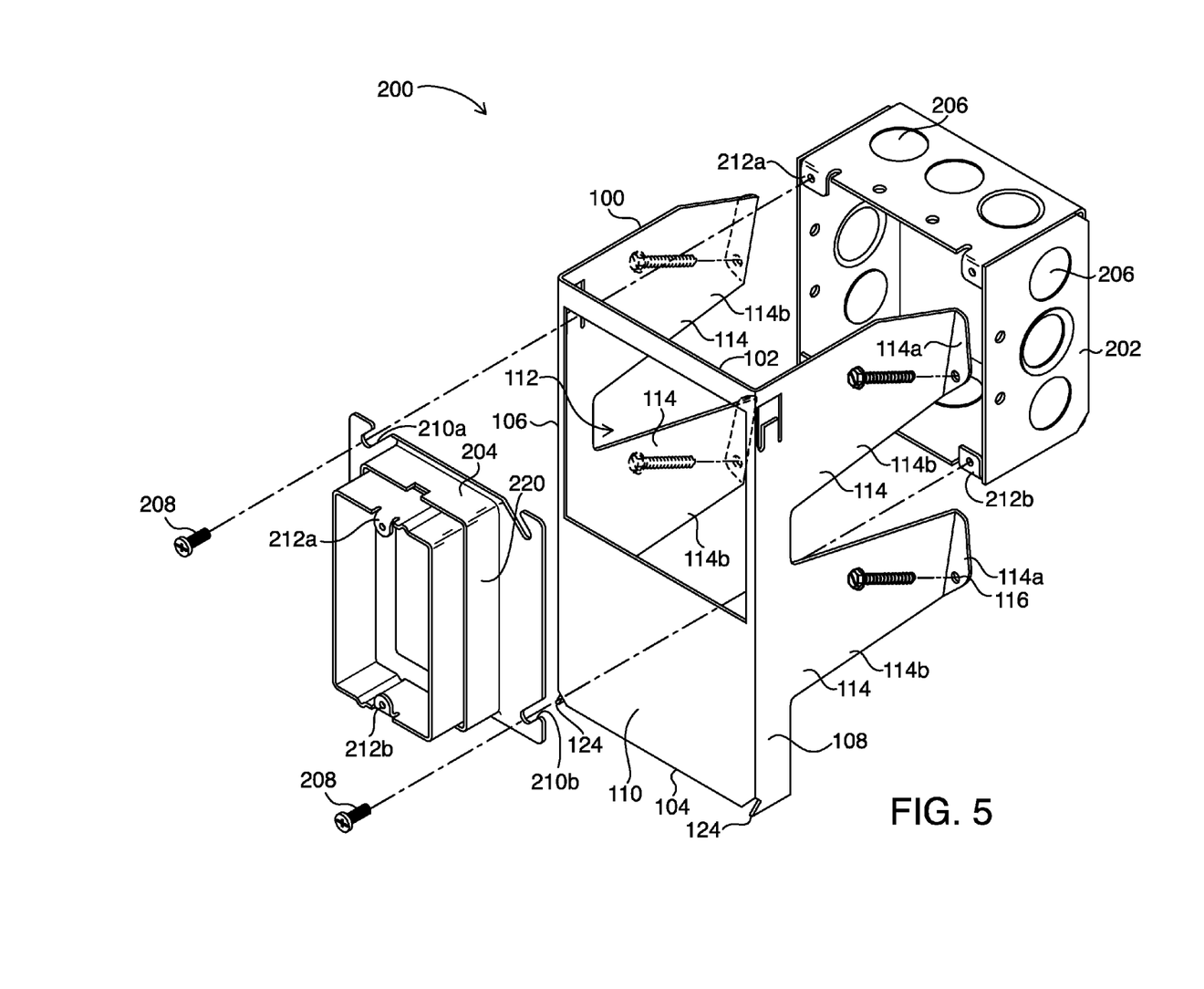
FIG. 5 is an exploded view of an electrical assembly in accordance with an exemplary embodiment of the present disclosure.

Referring to FIG. 5, an exploded view of an electrical assembly 200 in accordance with one embodiment of the present disclosure is illustrated. In preferred embodiments, the assembly 200 includes an electrical box 202, a cover plate or frame 204, and the bracket 100 as described herein. The electrical box 202 is attached to the cover 204, via the opening 112 so as to sandwich or otherwise secure the planar portion surrounding the opening 112 substantially between the box 202 and the cover 204, forming the assembly 200.

The electrical box 202 can be any of a number of conventional electrical boxes formed of a rigid material, such as sheet metal or plastic. As shown, the box 202 has an open front for cooperating with the opening 112 and to allow electrician access for the installation of electrical receptacles, wiring conduit, and the like. Knock-out panels 206 can be provided in the box 202 to facilitate such installation. Although a substantially square box and box opening is illustrated in the Figures, it will be understood that the box 202 and/or the opening thereof could be rectangular, circular, or any other desirable configuration. The choice of the box shape and/or opening may depend, for example, upon the shape of the bracket opening 112, as discussed above. In one embodiment, for example, box 202 and/or the opening thereof can be substantially rectangular-shaped, substantially square-shaped, or substantially circular-shaped. Oval, triangular, or any other polygonal shapes for box 202 and/or the opening thereof are also contemplated.

As noted above, the assembly 200 also includes cover 204, which covers the opening 112 and the open front of the box 202. The cover 204 is connected to the box 202 by multiple fasteners 208, received by one or more openings 210a, 210b in the cover and corresponding holes 212a, 212b in the box 202. Exemplary fasteners 208 include, but are not limited to, threaded screws, nuts and bolts, and other suitable fastening devices. The cover 204 may be adjusted on the assembly 200 by moving the cover 204 and/or box 202 with respect to optionally elongated openings 210a, 210b.

Figure 6:
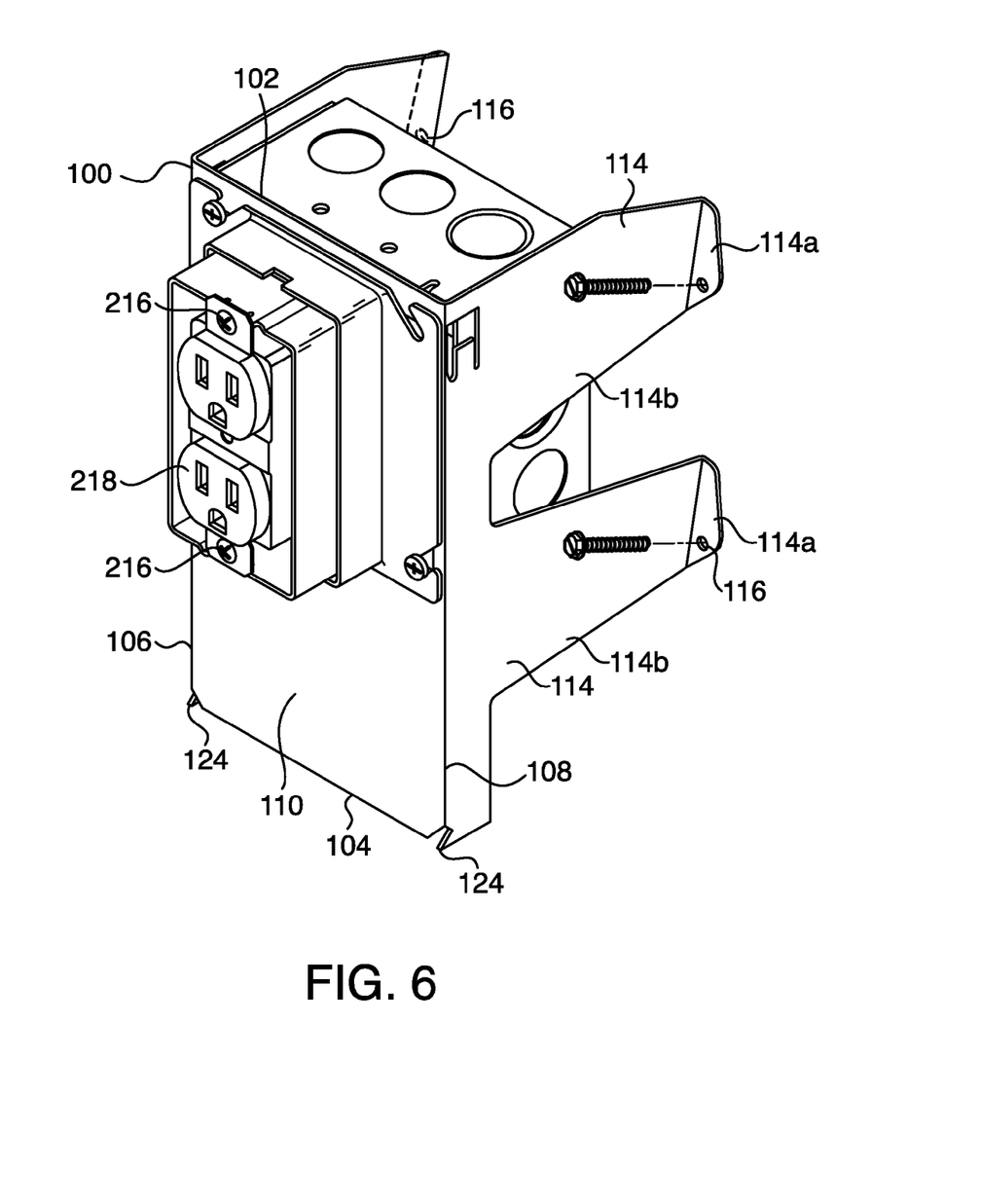
FIG. 6 is a perspective view of an electrical assembly in accordance with an exemplary embodiment of the present disclosure and further including an exemplary electrical receptacle.

The cover 202 at least partially covers the opening 112 and the box opening and carries openings 212a, 212b for mounting one or more electrical devices 218 with fasteners 216 received by openings 212a, 212b. Exemplary fasteners 216 include, but are not limited to, threaded screws, nuts and bolts, and other suitable fastening devices. Exemplary electrical devices 218 include convenience outlets (shown in FIG. 6, for example), electrical switches, electrical terminals, or any other suitable device. As shown in the Figures, the cover 202 may also include a frame portion 220 for offset mounting of an electrical device with respect to opening 112 and the box opening, such that the electrical device is substantially flush with the front surface of the CMU wall.

Figure 7:
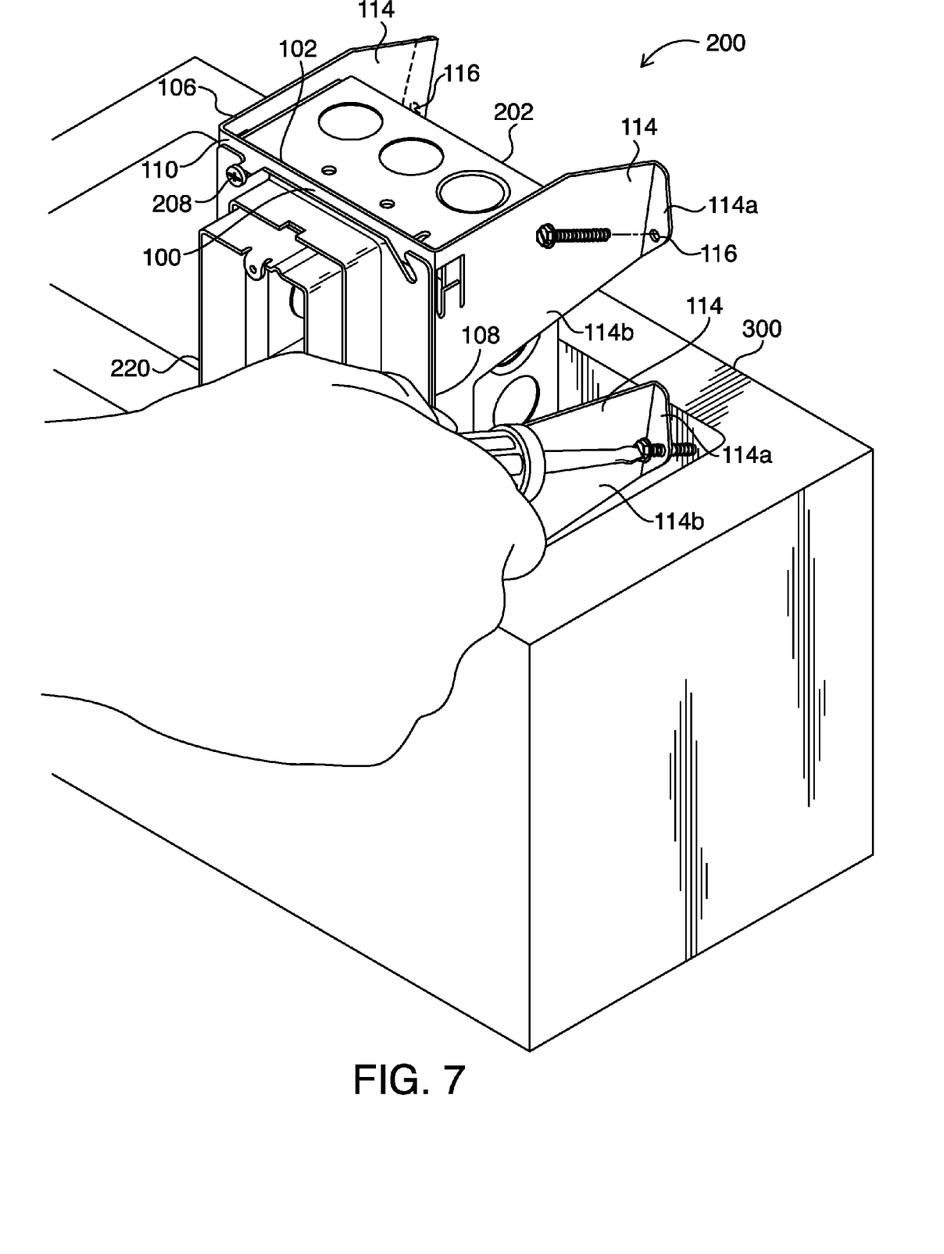
FIGS. 7-9 depict the securing of an electrical assembly within a CMU in accordance with an exemplary embodiment.
Figure 8:
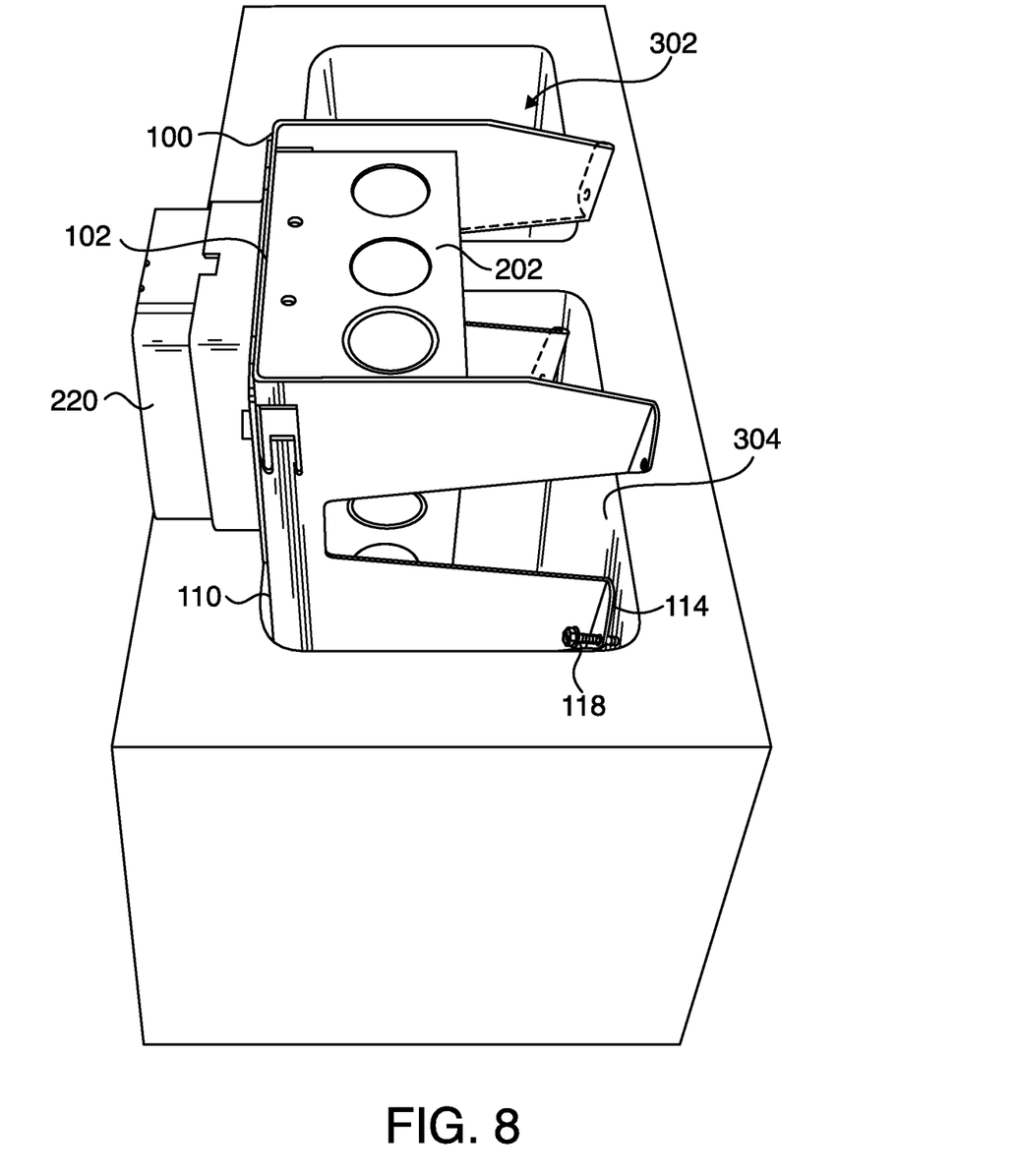
Figure 9:
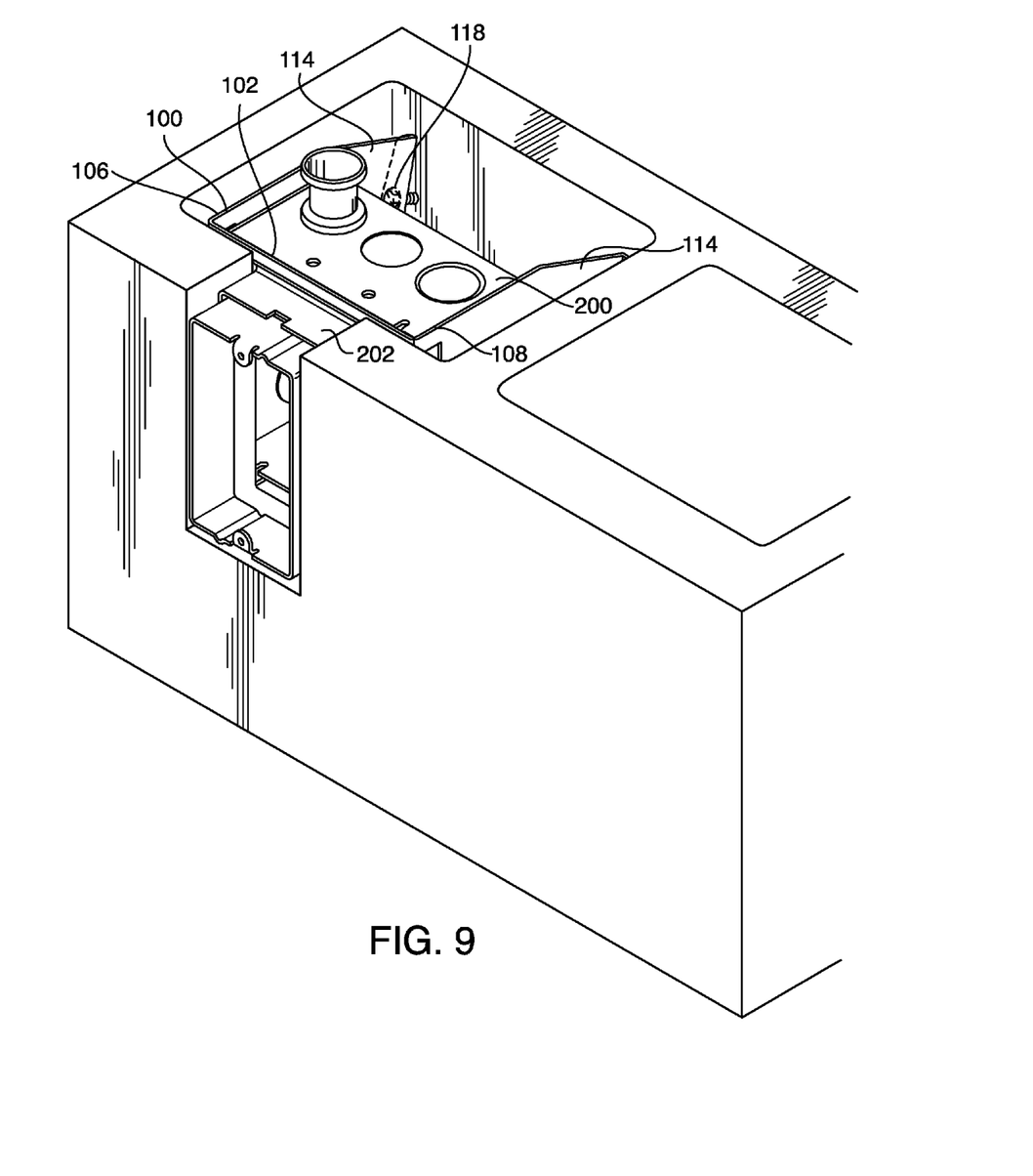
Figure 10:
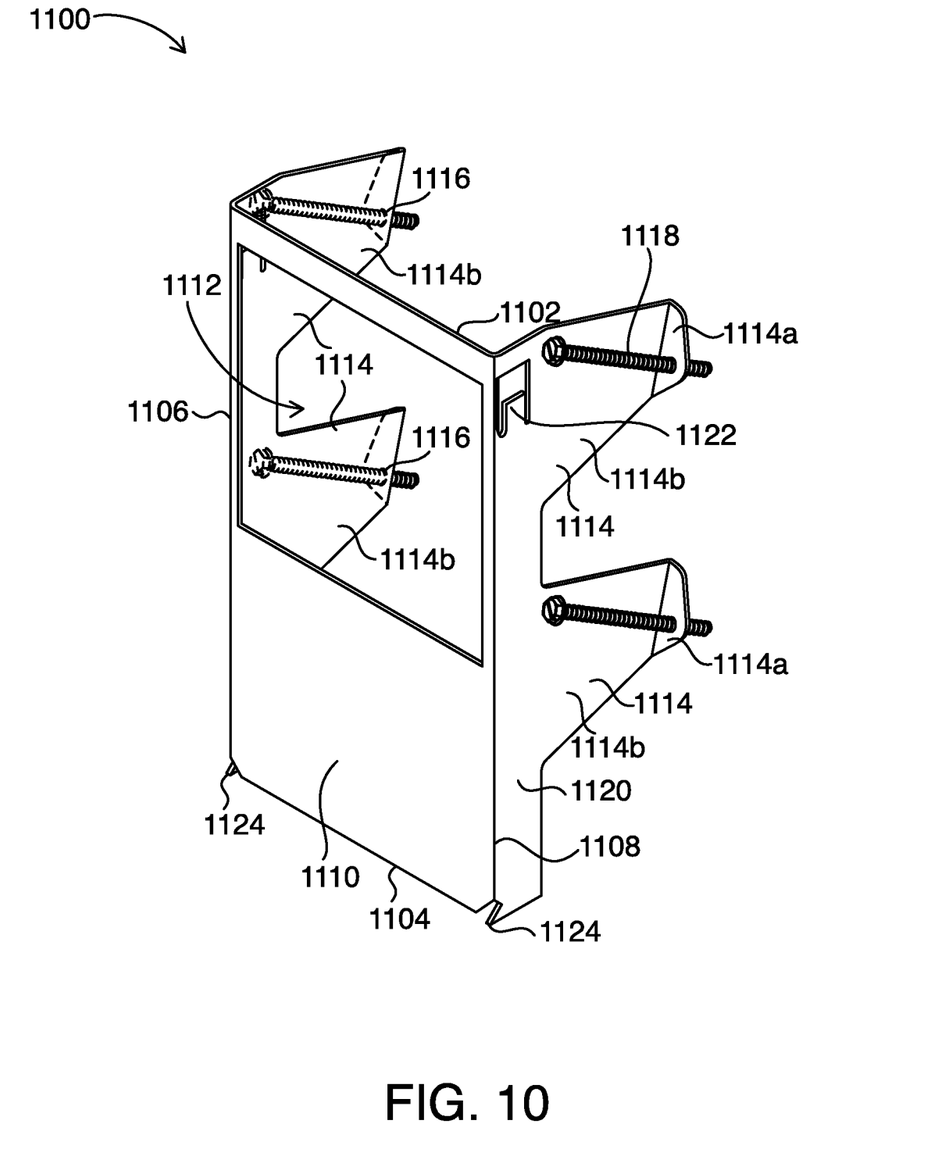
FIG. 10 is a perspective view of a bracket in accordance with another exemplary embodiment of the present disclosure.
Figure 11:
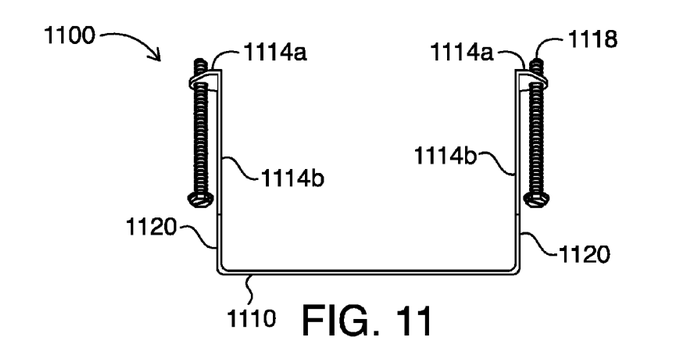
FIG. 11 is a top side view of a bracket in accordance with another exemplary embodiment of the present disclosure.
Figure 12:
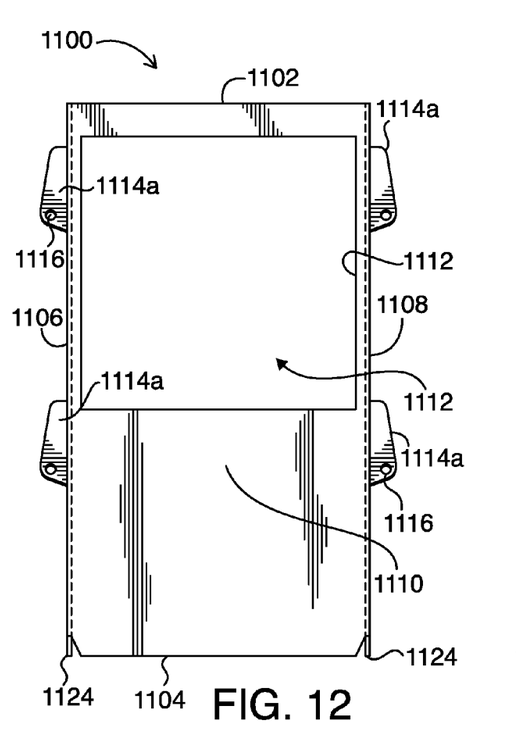
FIG. 12 is a front side view of a bracket in accordance with another exemplary embodiment of the present disclosure.
Figure 13:
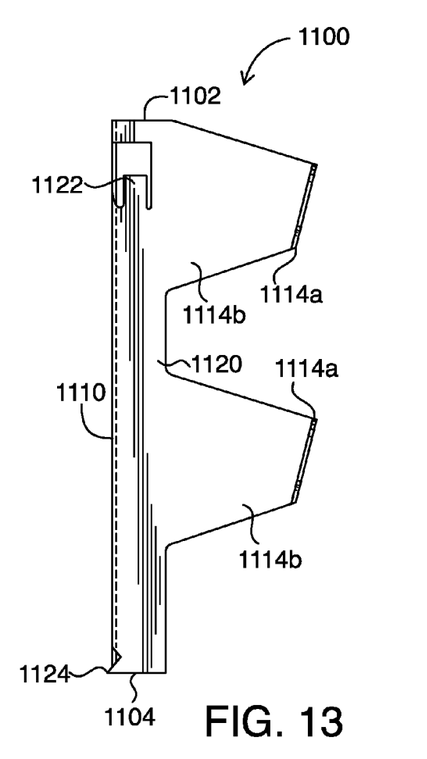
FIG. 13 is a right side view of a bracket in accordance with another exemplary embodiment of the present disclosure.

Referring to FIGS. 7-9, in use the bracket (alone or in combination with a receptacle box and cover plate to form an electrical assembly) is used in connection with a CMU 300 and, in particular, is inserted into the hollow inner cavity or core 302 of the CMU and mounted or otherwise secured to an inner surface 304 thereof. In a particular embodiment, the support member(s) 114 are fastened to the CMU 300 by fasteners (e.g., screws, nails, and the like) extending through the holes 116 in mounting portion 114a and/or support member arm 114b of the support member(s) 114, as noted above. When installed, the position of the cover plate 202 may be flush with the front face of the CMU wall (see, e.g., FIG. 9), or may be recessed or projecting, as desired.

Referring to FIGS. 10-13, another exemplary bracket 1110 is illustrated. This bracket 1100 is generally similar to the bracket of FIGS. 1-4, with reference numbers 1102, 1104, 1106, 1108, 1110, 1112, 1114, 1114a, 1114b, 1116, 1118, 1120, 1122, and 1124 in FIGS. 10-13 having the same or similar description and function as reference numbers 102, 104, 106, 108, 110, 112, 114, 114a, 114b, 116, 118, 120, 122, and 124 in FIGS. 1-4 discussed above. In FIGS. 10-13, however, the support members 1114 are shorter than support members 114 in FIGS. 1-4, while the fasteners 1118 are longer than the fasteners 118 in FIGS. 1-4. As discussed above, the bracket of FIGS. 10-13 may be used with longer mounting hardware (as shown) or in CMU's having smaller inner core region dimensions (not shown).

In general, methods of the present disclosure include methods of securing an electrical assembly including the bracket described herein within the inner core of a CMU. The methods involve combining the bracket, electrical box, and cover plate to form the assembly and securing the assembly (via the bracket) within the CMU. One of skill in the art will recognize that the user can complete these steps in any particular order.

Although FIG. 7 depicts the assembly (or bracket) being mounted to the CMU using a hand screwdriver, it will be understood that electrical or battery-operated power tools may also be employed. It will be understood that it may not be necessary to completely drive the fasteners into the CMU; a few turns of the fastener with a hand tool or power tool may be sufficient to secure the bracket and/or assembly within the inner core region of the CMU. Further, it will be understood that where the support members are configured to apply a force to the surface(s) of the inner core region of the CMU, hand tools or power tools may not be necessary to secure the bracket and/or assembly within the inner core region of the CMU.

The present disclosure is well adapted to attain the ends and advantages mentioned as well as those that are inherent therein. The various embodiments disclosed above are for illustrative purposes only, as the present disclosure may be modified and practiced in different but equivalent manners apparent to those of ordinary skill in the art having the benefit of the teachings herein. Having described some exemplary embodiments of the present invention, it will be understood that the brackets and assemblies and components thereof may be formed and/or used in a variety of sizes. For example, any desired size of open portion to permit the use of more than one electrical device within the electrical box is contemplated. The use of ganged devices also is possible. While numerous changes may be made by those having ordinary skill in the art, such changes are encompassed within the spirit and scope of this disclosure as defined by the appended claims. Furthermore, no limitations are intended to the details of construction or design herein shown, other than as described in the claims below. It is therefore evident that the various illustrative embodiments disclosed above may be altered or modified and all such variations are considered within the scope and spirit of the present invention as defined by the claims below. The terms in the claims shall have their plain, ordinary meaning unless otherwise explicitly and clearly defined by the patentee.

What is claimed is:

1. A bracket for securing an electrical assembly within an inner core region of a concrete masonry unit (CMU), the bracket comprising
    a face portion having a front side, a back side, and a bracket opening configured to cooperate with a front opening of an electrical box when the electrical box is positioned on the back side of the face portion; and
    two or more support members extending rearwardly away from the back side, wherein the support members include one or more holes configured to receive one or more fasteners for securing the bracket to an inner core surface of the inner core region of the concrete masonry unit (CMU).

2. The bracket of claim 1, wherein the face portion is substantially planar.

3. The bracket of claim 1, wherein the bracket comprises four support members.

4. The bracket of claim 1, wherein the support members are configured to apply a force to opposing inner core surfaces of the inner core region of the concrete masonry unit (CMU).

5. The bracket of claim 1, wherein the bracket opening is substantially rectangular-shaped, substantially square-shaped, or substantially circular-shaped.

6. The bracket of claim 1, wherein the two or more support members each comprise a support member arm and a mounting portion extending from the support member arm, and wherein the holes for mounting each support member to the inner core surface of the concrete masonry unit (CMU) with the fasteners are disposed in one or more of the support member arm and the mounting portion.

7. The bracket of claim 6, wherein each support member arm extends substantially perpendicularly rearwardly away from the back side and the mounting portion is connected to the support member arm such that the mounting portion is substantially parallel to the back side.

8. The bracket of claim 1, wherein the bracket comprises four support members, each support member having one hole for mounting the bracket to the inner core surface of the inner core region of the concrete masonry unit (CMU).

9. The bracket of claim 1, wherein the one or more fasteners are selected from threaded screws, nuts and bolts, screw or nail anchor systems, and combinations thereof.

10. The bracket of claim 1, wherein the one or more fasteners are threaded screws.

11. An electrical assembly comprising:
an electrical box having top, bottom, and side walls defining a front opening;
a bracket for securing the assembly within an inner core region of a concrete masonry unit (CMU), the bracket comprising a face portion having a front side, a back side, and a bracket opening configured to cooperate with the front opening of the electrical box when the electrical box is positioned on the back side of the face portion; and two or more support members extending rearwardly away from the back side for securing the bracket to an inner core surface of the inner core region of the concrete masonry unit (CMU); and
a cover plate for positioning on the front side of the face portion and mounting on the electrical box in a covering relationship to the front opening and the bracket opening and capable of mounting an electrical device.

12. The electrical assembly of claim 11, wherein the electrical device is selected from an electrical receptacle, an electrical switch, an electrical terminal, and combinations thereof.

13. The electrical assembly of claim 11, wherein the electrical assembly further comprises the electrical device mounted on the cover plate.

14. The electrical assembly of claim 11, wherein the face portion is substantially planar.

15. The electrical assembly of claim 11, wherein the bracket comprises four support members.

16. The electrical assembly of claim 11, wherein the bracket opening is substantially rectangular-shaped, substantially square-shaped, or substantially circular-shaped.

17. The electrical assembly of claim 11, wherein the support members include one or more holes configured to receive one or more fasteners for securing the bracket to the inner core surface of the inner core region of the concrete masonry unit (CMU).

18. The electrical assembly of claim 17, wherein the two or more support members each comprise a support member arm and a mounting portion extending from the support member arm, and wherein the holes for securing each support member to the inner core surface of the inner core region of the concrete masonry unit (CMU) with the fasteners are disposed in one or more of the support member arm and the mounting portion.

19. The electrical assembly of claim 18, wherein each support member arm extends substantially perpendicularly rearwardly away from the back side and the mounting portion is connected to the support member arm such that the mounting portion is substantially parallel to the back side.

20. The electrical assembly of claim 17, wherein the one or more fasteners are selected from threaded screws, nuts and bolts, screw or nail anchor systems, and combinations thereof.

21. The electrical assembly of claim 17, wherein the one or more fasteners are threaded screws.

22. The electrical assembly of claim 11, wherein the support members are configured to apply a force to opposing inner core surfaces of the inner core region of the concrete masonry unit (CMU).

23. The electrical assembly of claim 11, wherein each support member has two or more holes for mounting the bracket to the inner core surface of the inner core region of the CMU.

24. A method of mounting the electrical assembly of claim 11 within the inner core region of a concrete masonry unit (CMU), the method comprising combining the bracket, electrical box, and cover plate to form the assembly and securing the assembly, via the bracket, within the inner core region of the concrete masonry unit (CMU).

25. A kit comprising the electrical assembly of claim 11.

* * * * *